Figure 1:
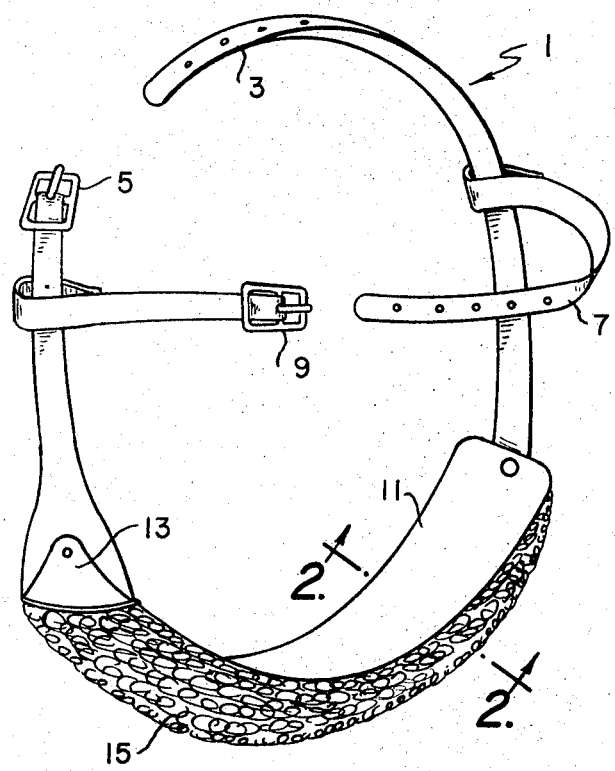

United States Patent [19]
McBride

[11] 3,842,806
[45] Oct. 22, 1974

[54] PREDATOR PROTECTION COLLAR FOR LIVESTOCK

[76] Inventor: Roy T. McBride, P.O. Box 725, Alpine, Tex. 79830

[22] Filed: Oct. 24, 1973

[21] Appl. No.: 409,103

[52] U.S. Cl. .............................................. 119/106
[51] Int. Cl. ........................................... A01k 27/00
[58] Field of Search ......... 119/106, 143; 43/84, 131

[56] References Cited
UNITED STATES PATENTS
1,349,665  8/1920  Duncombe ........................ 119/106

Primary Examiner—Hugh R. Chamblee
Attorney, Agent, or Firm—Thomas Zack; Frank A. Lukasik

[57] ABSTRACT

A collar used to kill or repel predators which attack livestock. A closed vessel enclosed by a camouflaged sheath contains an aversive or toxic substance. To insure that the aversive or toxic substance is expelled into the mouth of the predator, the substance may be put under pressure when first placed in the vessel. The camouflaged covering should resemble the livestock's natural covering in looks and feeling to make sure the predator attacks in the area of the collar. A leather strap and buckle, with or without a browband, may be used to firmly attach the invention to the desired area of the livestock.

7 Claims, 3 Drawing Figures

PATENTED OCT 22 1974　　3,842,806

AVERSIVE OR TOXIC SOLUTION

PREDATOR PROTECTION COLLAR FOR LIVESTOCK

BACKGROUND OF THE INVENTION

1. Field of the Invention

My invention is an improved collar used to protect livestock from predators. More specifically it is a collar containing an aversive or toxic substance into which the predator bites to release it.

2. Description of the Prior Art

From practically the beginning of recorded history man has sought ways to eliminate predators that prey on his livestock. Particularly troublesome have been coyotes that attack sheep. Various methods and devices have been used to kill or repel the predators. Besides the direct action devices like spears, guns, etc., where the opertor must actually be on the scene to actuate them, steel traps, spring guns, snares, and toxicants have been used to eliminate or otherwise cause the coyotes to refrain from attacking the sheep. The latter group of devices can broadly be classified as passive since they require some affirmative action by the predator before they are effective with no action by the operator after they are set. These passive devices have in many cases had the drawback that they indiscriminately inflict injury or death on their actuator whether the actuator is a predator or not. When toxic substances are used as these passive devices there is also the additional environmental pollution hazard that may occur when the substance is spread on the ground or released to the environment.

Collars that contain germicidal ingredients to repel insects, like fleas, from dogs or cats are well known. Usually these collars have perforations or are made of porous material which allow the germicidal ingredient to be dispersed onto the animal. The U.S. Pat. No. 2,791,202 to Doyle is an example of such a collar having perforations to allow the volatiles to get into the animal's neck. Collars for sheep that use mechanical injectors to exterminate coyotes are also old as evidenced by the J. Duncombe U.S. Pat. No. 1,349,665. However, in none of these collars is a toxic or aversive substance placed in a simple closed container with no moving parts. Further, by camouflaging the collar so that it resembles the livestock, the probability the predator will attack in the desired location is greatly increased. By keeping the toxic substance in a closed container until it is ready to be used pollution of the environment is kept to a minimum, at the same time only the predator is selectively affected by the toxic or aversive when he attacks.

SUMMARY

The improved collar of my invention has a closed vessel to retain the substance near the body of the livestock, a strap attached to the vessel to fasten the collar to the animal, and a sheath with an outer camouflaged cover to enclose the vessel.

The primary object of this invention is an improved predator collar for use by livestock.

Figure 2:
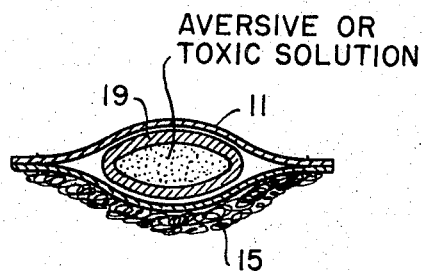
Figure 3:
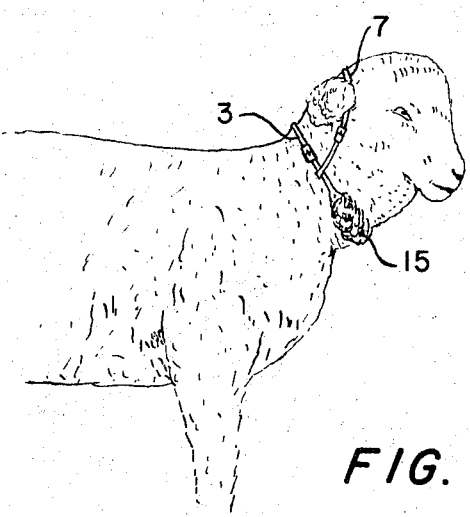

FIG. 1 is a frontal view of the collar. p
FIG. 2 is a cross-sectional view along line 2—2 of FIG. 1.
FIG. 3 show how the preferred embodiment is placed upon a lamb.

The preferred embodiment of my collar has several basis interrelated parts. Leather neckbank 1 has a strap 3 with a series of holes to engage buckle member 5. A leather browband having a holed end 7 and buckle 9 may be attached to the neckband to further assist in holding the collar to an animal. A wide flattened surface 11 comprising another portion of the neckband engages the body of the animal where a predator is most likely going to attack. A sheath is formed by surface 11 and the joined outer camouflaged surface 15 as best shown in FIG. 2. This camouflaged surface is about the same size and configuration as the surface 11 except that it extends outwardly. For a lamb, surface 15 would be lambskin with a fleece covering.

Within the enclosure formed by the sheath formed by the two flattened surfaces 11 and 15 is a flat elastic water-tight rubber tube 19 which acts as a closed vessel to hold the liquid aversive or toxic substance. An end flap 13 on the sheath allows access to the vessel to insert the tube 19 with its liquid under pressure into the vessel.

This preferred embodiment was especially constructed to kill or repel coyotes by recognizing some of their attacking habits. By configuring the invention so it covers the jugular vein and windpipe of the sheep, the tendancy of the coyote to strike its victim is taken into consideration. Experience has shown that coyotes are remarkably consistent in their pattern of attack on a lamb or kid goat. Usually when the coyote first begins biting the lamb it punctures the skin in several areas on the body or hindquarters. However, the fatal bite is accomplished when the coyote penetrates the lower part of the lamb's neck behind the posterior region of the jaw bone to sever the jugular vein and windpipe of the lamb. By placing the covering over this area the effectiveness of its intended performance is greatly increased. As shown in FIG. 3 the strap 3 goes around the neck of the lamb below its ears and the browband 7 is placed over the ears. Surface 11 is placed on the underside of the lamb's neck surface below the mouth and above the lamb's chest.

When the invention is placed on a lamb as shown in FIG. 3, it is bearly visible to an attacking coyote. More importantly once the coyote comes into contact with the lamb the feel of the fleece surface 9 will not signal to him the danger that lies underneath. Once the teeth of the coyote piece surface 15 and rupture the inner vessel 19, the pressurized liquid it contains is expelled to inject itself into the mouth of the predators. Depending on the liquid used, the coyote is then either driven away or poisoned in a short time.

Many or the toxic substances that can be used in tube 19 are the same ones that have been used in the past to bait pork fat, beef tallow or horse flesh. Example includes sodium cyanide, strychnine alkaloid, thallium sulfate, and sodium monofluoroacetate. However, it is not the composition of the toxic that makes this invention important, but rather that the toxic is kept contained in a closed vessel until it is needed. Pollution of the environment would, as a result, be kept to a minimum. To kill coyotes that attack lambs I have found sodium monofluoroacetate to be especially effective because it is odorless and tasteless to the coyotes. Also it has the advantage of being toxic to coyotes in certain small dosages and not toxic to other animals in the same dosages.

There are several ways this invention can be employed to protect a herd of sheep or other animals. First, one collar could be attached to each animal if their number is small and the cost is no problem.

Should the number be large so as to impose a financial burden one procedure is to selectively pick a few of the herd and place collars on them. Usually the way this is accomplished is by noting a certain pack of sheep in a fenced area that has been attacked previously by coyotes and then placing collars on a selected number of the pack. Only the sheep with collars are then replaced in the fenced area. Because the coyotes are creates of habit, they will attack these selected sheep and attempt to carry their remains to their dens several miles away. Both of these procedures usually result in sacrificing the lamb which is attacked. This is preferable to the case where five or six lambs are attacked by one coyote in a night and where the coyote is still free to attack again. One point to make note of is that every coyote is not necessarily a killer of livestock. Usually only a small number of the coyote are killers and it therefore would be indiscriminate cruelty to commit wholesale slaughter on their entire pack. My invention selectively destroys or repels only the proven killers from the pack and thereby insures survival of the species. As has been pointed out it does this with a minimum of environmental pollution.

It should be apparent that other predators besides coyotes may be repelled or killed by my invention and that other animals beside sheep can be protected by it. None of the specifically disclosed features should be used to limit the scope and extent of my invention which is to be measured only by the scope of the claims which follow.

I claim:

1. An animal collar containing a liquid substance comprising:

means for fastening the collar to the animal;

a sheath attached to said fastening means and having an outer covering resembling the natural surface of the animal in color and feel; and a closed vessel to confine said liquid substance therein adapted to remain within said sheath until ruptured by a predator.

2. The collar of claim 1 wherein said fastening means is made of an elongated leather member with a buckle at one end and means to engage the buckle at the other end.

3. The collar of claim 1 wherein said outer covering of the sheath has lambskin with fleece attached.

4. The collar of claim 1 wherein said vessel is configured in shape similar to the shape of the sheath and its confined liquid substance is toxic to coyotes.

5. The collar of claim 2 including a browband forming part of said fastening means with means to attach the band to an animal.

6. The collar of claim 1 wherein said liquid is pressurized when placed in the vessel and said vessel is made of an elastic material.

7. A collar to be worn by sheep comprising:

means to attach the collar to the neck portion of the sheep;

a sheath with an outside camouflaged covering joined to said attaching means; and said sheath having means to gain access to its interior; and a closed elastic tubular shaped vessel insertable within said sheath which contains a pressurized liquid toxic substance whereby a predator attacking said sheep will pierce said outer camouflaged covering and rupture said vessel to release the confined toxic substance.

* * * * *